Figure 1:
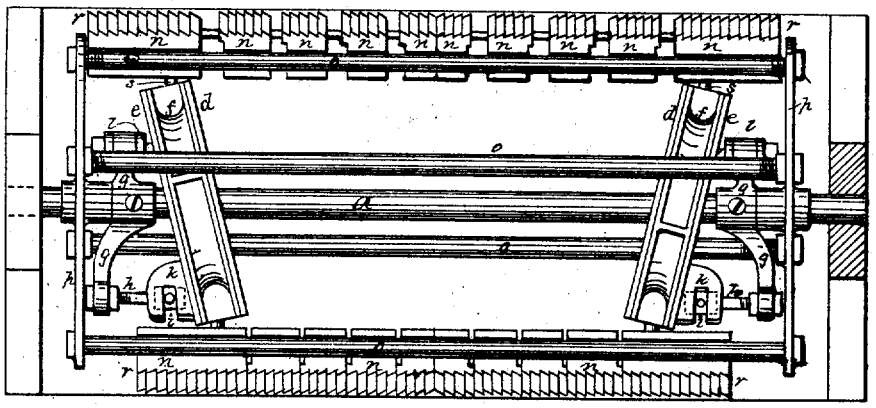

C. A. LUTHER.

Cloth-Stretching Machine, &c.

No. 8,922. Reissued Oct. 7, 1879.

*Witnesses:*

Philip F. Larner

Howell Battle

*Inventor:*

Charles A. Luther.

By O. McWood

Associate Atty.

UNITED STATES PATENT OFFICE.

CHARLES A. LUTHER, OF PAWTUCKET, RHODE ISLAND.

IMPROVEMENT IN CLOTH-STRETCHING MACHINES, &c.

Specification forming part of Letters Patent No. 190,600, dated May 8, 1877; Reissue No. 8,922, dated October 7, 1879; application filed May 31, 1879.

*To all whom it may concern:*

Be it known that I, CHARLES A. LUTHER, of Pawtucket, in the county of Providence and State of Rhode Island, have made and invented certain Improvements in Cloth-Stretchers and Calendering-Machines, of which the following is a specification.

The machine hereinafter described belongs to that class of rotary cylindrical cloth stretching or spreading machines which are furnished with parallel sets of stretchers, made up of "lags" or short blocks having roughened or ratchet faces, linked together in longitudinal rows, for taking a hold upon a piece of cloth to be stretched or spread transversely. These linked stretchers are arranged around the central longitudinal shaft or axis of the series of revolving stretchers, with the two end blocks of each row in combination with circular guides or cams, grooved upon their peripheries and set opposite each other, near the ends of the machine, so as to occupy converging planes, which intersect diagonally the longitudinal axis of the central shaft. The office of the said grooved guides or cams is to impart a lateral movement of the respective rows of linked stretchers as the series of stretchers is revolved, and, by gradually extending each row in length from the minimum to the maximum distance between the planes occupied by the said circular cams, stretch the piece of cloth in a transverse direction to the same extent as it travels along.

The novel characteristic of my machine, which distinguishes it from previous machines of the same general class above described, is, that the circular guides or cams, which are inclined toward each other, for the purposes described, and which are always required to be so mounted that the angle of their divergence may be varied to properly stretch fabrics of different textures, are arranged to be vibrated, for the purpose of being adjusted in position, upon pivots which are located in a plane radial to the axis of the central shaft or stretcher-cylinder, and substantially at the end of a radius of each cam, respectively.

Heretofore the said guides or cams, governing the movements longitudinally of the rows of linked stretchers, have been arranged to be vibrated for adjustment upon pivots located at or near the axis of their central shaft, or so far within the length of the radius of such cams that any change in the angle of divergence of their planes necessarily varied the distance between their points of nearest approach, and required the cams to be readjusted in a longitudinal direction relatively to each other to preserve a proper relation of the stretchers at the place where the roll of cloth to be spread is taken onto the machine.

Instances of pre-existing machines referred to will be found in English Letters Patent No. 7,655, old law, No. 509 of A. D. 1854, and No. 1,317 of A. D. 1865.

Figure 2:
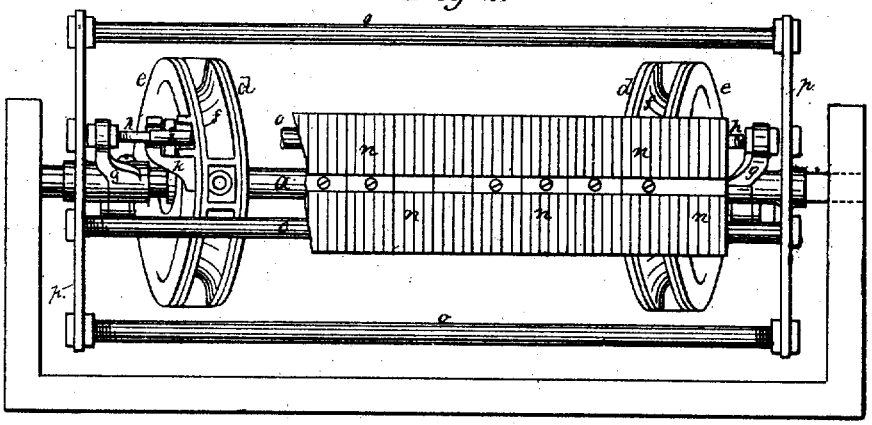
Figure 3:
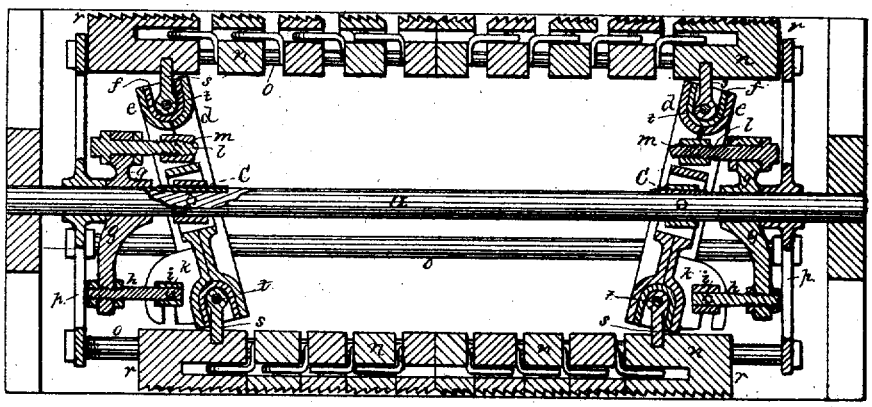

Referring to the drawings, Figure 1 is a top view of the device. Fig. 2 is a side elevation, having part of the exterior torn away to show interior mechanism. Fig. 3 is a vertical section lengthwise of the stretching-cylinder.

*a* shows the main shaft, on which are the center-boxes C C, as seen in Fig. 3. These center-boxes are furnished with two exterior trunnions each, which fit into trunnion-rests in the interior of the adjustable guides or cams, and which support the said cams and steady them when in operation. These center-boxes are combined with the shaft by means of a spline, and are allowed a limited sliding motion on said shaft to accommodate the variable relative position of the adjustable guides or cams when the changes are made, as hereinafter described. The said cams are composed of the two outer sides or disks, *d e*, the peculiar shape of each of which, as well also as the shape of the chambered ring hereinafter mentioned, is more plainly seen in Fig. 3.

The parts *d e* are firmly bolted together, and hold between them a superficially-chambered ring, *f*, which fits into and is intended to revolve in the hollowed periphery of the jointed sides *d e*, as seen in Fig. 3.

Attached to each end of the shaft *a* is an angular arm, *g*, the longer end of which supports and firmly holds in place the bar *h*. The opposite end of this bar terminates in a pivotal block, *i*, resting in a double curvilinear attachment, *k*, projecting from the outer sides. This pivotal block *i* is the fulcrum on which the cam is made to oscillate whenever a change of its position is effected, as hereinafter described.

The parts forming the cam, as seen at *d e*, are cast with a chamber, in which is placed a smaller pivotal block, *m*. The shorter projection of the arm *g* holds one end of the threaded bolt or screw *l*, the other end of which passes into and through said pivotal block *m*. By the operation of this screw *l* and its connections the adjustability of these parts is made available. The outer end of the screw *l* is furnished with shoulders on either side of the short projection of the arm *g*, as seen in Fig. 3, and has a nut-shaped termination, by which said screw may be operated.

The exterior of the machine consists of the ratcheted longitudinal strips or lags *n n*, which are supported by longitudinal bars *o o*, running between and connecting the outer circular rests, *p p*. Although only two of these sliding ratcheted strips are shown in the drawings, yet the entire peripheries of the circular rests *p p* and the space between them will be covered by these sliding lags in a completed machine, the remaining strips being omitted from the drawings in order to better exhibit the mechanism and construction of the other parts of the device.

The parts *n n* are divided into sections, as seen in Figs. 1 and 3, and these sections are linked together by metallic rods or wires, as shown, there being sufficient play of each section upon its respective link to permit the sections to be spread apart, as seen in the upper parts of Figs. 1 and 3, and afterward to be drawn together, as seen in the lower parts of the same figures. Each longitudinal row of sections in this instance is divided at the middle line, and one half of such row is under the control of one of the cams or guides and the other half is under the control of the fellow cam or guide. The outermost of these sections *r r* have a lug, *s*, projecting inwardly therefrom into a chamber in the ring *f*, in which it is secured by the transverse pin or shaft *t*, and on which pin or shaft it may have the rocking motion required by the changing positions of the sections aforesaid Each of the figures in the drawings shows the guides or cams set in position for use, their lines of divergence commencing at the line where the sliding strips *n* receive the cloth to be stretched or material to be finished. and which is the line of their nearest approach. Their lines of rotation then commence to diverge, while the cloth or material remains in contact with the machine, and as soon as the cloth leaves the stretcher the rotary lines of these cams will converge during the remainder of their revolution.

In the form of the device here shown and described, the shaft *a* and the jointed parts of the cam *d e* are designed to be stationary, while the circular rests *p p* and the sectional ratcheted strips aforesaid have a positive motion imparted to them by the passage of the cloth, or otherwise by direct application of power, as may be preferred. This positive motion of the lags *n n*, coupled with the projecting lug *s*, necessarily revolves the chambered ring *f* in the hollowed periphery of the parts *d e* of said cam. The combination of said lags *n n* and lug *s* with the chambered ring aforesaid causes a gradual but inevitable spreading apart of said sections, and produces a consequent stretch of the cloth, proportionate in degree to the previous adjustment or setting of said cams or guides.

Whenever any change is desired in the position of said cams, to adapt the machine to different kinds and grades of goods, turn the threaded bolt or screw *l* to the right or left, and the line of deflection of said cams will be immediately increased or decreased. In effecting these changes of position the cams are made to oscillate on the trunnions projecting from the center-blocks, C. The proper position of the fulcrum-pivot *i* is obtained, when the line of the bar *h*, if extended, will pass through the ball-shaped end of the lug *s* as the latter, in its revolution, comes opposite the end of said bar, accuracy in this particular being necessary in order that the lags or sectional strips *n* may be always brought around to and start from the same point, whatever the angle at which the cams may be set. At this starting-point the sections will have been all drawn together, but not tightly, and will always have precisely the same position relatively to each other, for the reason that the central longitudinal line of the sections in that position will lie in the same plane which passes through the line between the points of nearest approach of the cams or guides respectively, and this line is fixed in its length, because it is the distance between the fixed pivotal points upon which the guides or cams must vibrate when the angle of their divergence is to be changed.

Changes in the angles of inclination of the planes of the guides or cams relatively to the central longitudinal axis of the stretching-cylinder may be made while the machine is in operation, and the cam at one end may be changed without reference to the other, as may be desired, to meet any irregularities in the manufacture or finish of the goods. The machine is thus adapted to the stretching and finishing of coarse nettings and similar grades of goods, the variable textures and diagonal irregularities of the patterns being humored and corrected by means of the adjustability of the parts, as above described. These changes are also made without loss of time or derangement of construction, and are so easily and readily performed that the finest cambrics and coarsest nettings may be successively finished upon the same machine without material interruption.

The construction of the machine may be so varied as to have a rotary instead of a stationary shaft without materially affecting the principle or manner of constructing the adjustable cams aforesaid.

I am aware that the sectional lags *n* and the manner of linking them together, as well also as the manner of supporting them upon longitudinal bars running between the circular rests *p p*, are all old; but

What I claim as my invention in rotary cylindrical machines for spreading cloth, and desire to secure by Letters Patent, is—

1. The combination, substantially as before set forth, of the series of stretcher-blocks and the adjustable cams or guides pivoted on fixed fulcra located in a plane radial to the axis of the stretcher-cylinder, and substantially at the end of a radius of the cams or guides.

2. The combination, substantially as before set forth, of the adjustable cams or guides having fixed fulcra near their peripheries, a revolving chambered ring appropriate to each cam, and the series of linked stretcher-blocks.

3. The combination, substantially as before set forth, of the adjustable cams or guides, the fixed fulcrum supports or pivots for the cams, located near their peripheries, and suitable devices for adjusting the cams to their proper planes of divergence.

4. The combination of the adjustable cams or guides, the central shaft, and radial arms fixed to the shaft for each cam and furnished with means whereby the two ends of each of said arms are hinge-jointed to the sides of the cams, substantially as described.

5. The combination of the adjustable cams or guides, constructed with interior chambers, pivotal blocks set in such chambers, radial arms fixed to the central shaft, and adjusting-screws connecting said arms with the pivotal blocks for adjusting the planes which the said cams or guides shall occupy, substantially as described.

CHARLES A. LUTHER.

Witnesses:

GEORGE FULLER,

WILMARTH H. THURSTON.